(12) United States Patent
Takhiri et al.

(10) Patent No.: US 6,961,450 B2
(45) Date of Patent: Nov. 1, 2005

(54) PERSONAL IDENTIFICATION METHOD, ELECTRONIC IDENTIFICATION SYSTEM AND APPARATUS FOR PERSONAL BIOMETRICAL IDENTIFICATION BY GAUGING GEOMETRY OF THE PERSON'S HAND

(75) Inventors: Azar Mamed ogly Takhiri, Moscow (RU); Victor Valentinovich Zenovjev, Moscow (RU)

(73) Assignee: Intelligent Biometric Technology, Inc., Brooklyn, NY (US)

( * ) Notice: Subject to any disclaimer, the term of this patent is extended or adjusted under 35 U.S.C. 154(b) by 0 days.

(21) Appl. No.: 10/607,075

(22) Filed: Jun. 25, 2003

(65) Prior Publication Data

US 2004/0165753 A1 Aug. 26, 2004

(51) Int. Cl.[7] .............................................. G06K 9/00
(52) U.S. Cl. ..................................... 382/115; 340/5.81
(58) Field of Search .................................. 382/100, 115, 382/306, 127, 126; 340/5.52, 5.81, 5.82, 10.4; 902/25, 3, 4, 5, 7; 235/380; 379/88.2, 88.19, 88.21, 93.03, 118, 207.13, 207.14; 356/125, 71; 351/159; 713/186

(56) References Cited

U.S. PATENT DOCUMENTS

| | | | |
|---|---|---|---|
| 3,648,240 A | | 3/1972 | Jacoby |
| 5,483,601 A | * | 1/1996 | Faulkner ...................... 382/115 |
| 5,615,277 A | * | 3/1997 | Hoffman ...................... 382/115 |
| 5,786,582 A | * | 7/1998 | Roustaei et al. ........ 235/462.07 |
| 6,122,394 A | * | 9/2000 | Neukermans et al. ....... 382/124 |
| 6,317,544 B1 | | 11/2001 | Diehl |
| 6,393,139 B1 | | 5/2002 | Lin et al. |
| 6,404,904 B1 | | 6/2002 | Einighammer |
| 6,454,408 B1 | * | 9/2002 | Morris et al. ................ 351/159 |
| 6,522,772 B1 | | 2/2003 | Morrison |
| 6,552,781 B1 | * | 4/2003 | Rompel et al. ................ 356/71 |
| 6,560,352 B2 | * | 5/2003 | Rowe et al. ................. 382/115 |

FOREIGN PATENT DOCUMENTS

| | | |
|---|---|---|
| EP | 0972267 B1 | 10/2002 |
| FR | 2754369 | 4/1998 |

* cited by examiner

*Primary Examiner*—Kanjibhai Patel
*Assistant Examiner*—Abolfazi Tabatabai
(74) *Attorney, Agent, or Firm*—Darby & Darby

(57) ABSTRACT

The user identification method using electronic identification system, which contains electronic identification facilities connected through telecommunication facilities. According to the method in question during database forming the following operations are executed: identification of living matter presence on the identification surface while the user's hand is placed on the surface and the hand scanning subject to presence of living matter; forming of the user's geometry parameters set corresponding to the hand characteristic parameters; converting of the above set into the identification code; entry of the identification code and the individual information on the user in the identification facility memory unit database; comparing of the user's individual code to latter extracted from the identification facility memory unit database. Displaying on the identification facility monitor of individual information stored together with the identification code in identification facility memory unit database subject to positive result of comparing and forming of permissive access signal transmitted to execution facility.

21 Claims, 4 Drawing Sheets

PERSONAL IDENTIFICATION METHOD, ELECTRONIC IDENTIFICATION SYSTEM AND APPARATUS FOR PERSONAL BIOMETRICAL IDENTIFICATION BY GAUGING GEOMETRY OF THE PERSON'S HAND

FIELD OF THE INVENTION

The present invention pertains to personal identification method, system of its application and to apparatus for personal biometrical identification. To be more specific it pertains to personal biometrical identification by gauging geometry of the person's hand. The invention can be applied for personal identification by pass control systems, e.g. to prevent unauthorized access to any premises either in banks, or in organizations dealing with confidential information.

BACKGROUND OF THE INVENTION

There is a number of identification methods using positive biometrical characteristics have become known to present day. Certain personal identification methods are making use of different characters of a specific person, including: dactylograms, characteristic features, geometry of the person's hand, etc.

Search of sources known according to preceding technology level did not disclose any documentation rejecting novelty of the present invention. The following engineering solutions of the patents specified below are recognized analogue to the present group of inventions:

| Patent No | Country | Inventors, Assignees | Date of publication |
|---|---|---|---|
| 6522772 | US | James Morrison and others | Feb. 18th, 2003 |
| 6317544 | US | Jeffrey W. Diehl and others | Nov. 13th, 2001 |
| 6393139 | US | Min-Hsiung Lin and others | May 21st, 2002 |
| 6404904 | US | Hans J. Einighammer and others | Jun. 11th, 2002 |
| 0972267 B1 | EP | HillmannJurgen and others | Oct. 16th, 2002 |
| 2754369 | FR | Rajbenbach Henri and others | Apr. 10th, 1998 |
| 3648240 | US | Ian H. Jacoby and others | Mar. 7th, 1972 |

The U.S. Pat. No. 6,522,772 specifies self-service terminal control that include input device to identify code communicated by the user and biometrical sensor to identify biometrical characteristic of the user. Control terminal also includes processing unit connected to both input device and biometrical sensor through electric mains. Moreover control terminal also includes random-access memory connected to processing unit through electric mains. Random-access memory stores a great many of commands that being processed by processing unit make the latter to take biometrical profile of the user corresponding to the user imparting identification code, to determine whether the user inputs certain element onto self-service terminal control and to generate steering command with certain element in reply to it, to compare the user biometrical profile with the biometrical description and to generate steering command verifying identity subject to the user biometrical profile coincides with biometrical characteristic. Self-service terminal operation control method is also introduced.

The U.S. Pat. No. 6,317,544 specifies distributed biometrical identification system that includes a great many of workstations and remote file server. Workstations receive input biometrical data such as dactylogram and photographic data and link these biometrical data with remote file server. File server compares input biometrical data with stored biometrical data in order to determine whether stored biometrical data verify to input biometrical data. The results of comparing are sent to workstation, which sought comparing.

The U.S. Pat. No. 6,393,139 specifies access protection method and device of its application. The method in question allows identifying human being to be accessed by dactylogram and, above all, it corrects for the order of inputting dactylograms. By using dactylograms and the order of inputting it as identification criteria the device securing high level of safety against unauthorized access can be created.

The U.S. Pat. No. 6,404,904 specifies personal identification method based on reproduction of the hand and/or finger configuration by a camera that operates without contact between hand skin and registration facility. By using linear and round light polarization on the way of lightening and reproducing luminous radiation it becomes possible to obtain certain images of epidermis and hypodermis parts. Thus, highly contrasting image is secured and possibility to receive information on more deep skin layers full with blood is provided. The method allows locating human being to be identified over a distance from the identification apparatus.

The EP Patent No 0972267 B1 specifies personal identification method based on receiving and processing information relating to surface structure of palm, hand rib, four fingers and/or thumb. According to this method the palm side of the hand is put on scanning platform of the scanning prism. Surface structure image is registered with the help of ray path directed to the scanned surface and reflected by the scanned surface. Further on image is projected on receiving rectangular surface of optoelectronic image converter, which is formed of great many of individual sensors. While image is optically passed from scanning surface to optoelectronic image converter its profile is changing whereby height is compressed and/or width is expanded. Optically distorted image reach receiving surface and is converted to electronic information on image whereby precise analogue or digital values of each individual sensor output signal are obtained.

The most closely related analogues of the present invention according to identification method are the following ones:

The FR Patent No 2754369 specifies method and apparatus of personal identification by measuring hand configurations and comparing this measurement to previously measured parameters stored, for example, in random-access memory.

The U.S. Pat. No. 3,648,240 specifies method and apparatus of personal identification by optical measuring of great many of the prerecorded human being's hand parameters and momentary comparing this measurement to prerecorded parameters stored, for example, in random-access memory or on a coded card. During identification procedure a hand sensor equipped with a plate with recesses for fingers is used. Apparatus includes source of light to illuminate hand surface and optical scanning device that contains solar cell to generate separate electric impulses with temporary separation corresponding to numerous selected points located along the illuminated hand boundary. Electronic circuit device is also available, which is sensible to mentioned separated electric impulses and designed to measure and indicate the distance between pairs of mentioned selected points. Each of appropriate distances between selected points measured by optical scanning device is compared to prerecorded distances.

In certain inventions that permit to identify human being on the basis of geometry of the person's hand presenting of plaster cast with the same geometry instead of the user's hand is not inconceivable. At that time apparatus shall give "Object is identified" signal, though the real hand was not presented for identification. Scanning system used by certain apparatuses shall not guarantee scanning of the user's real hand geometry. Apart from it in certain inventions the hand to be identified must be fixed since positional correction rates are used for further image processing. Identification code structure in certain inventions is fixed, thus transgressor is let to get identification code pattern and to further use it for unauthorized access to any system.

SUMMARY OF THE INVENTION

The present invention liquidates disadvantages of certain engineering solutions owing to modification of the user identification method, electronic identification system and personal biometrical identification apparatus pertaining to characteristic geometry of the person's hand. Using a sensor identifying presence of a live hand in the applied invention eliminates any possibility of presenting plaster card in order to get unauthorized access to an object. Invention in question permits to avoid hand position holders, which became possible owing to use of an optical system providing scanning of real hand geometry upon distortion rate less than 1%. Due to use of identification code structure set up (or change) algorithm there appears possibility to create systems of unique identification code structure, individual to each project.

According to the present invention, the user identification method uses an electronic identification system including an electronic identification facility connected through telecommunication devices. The user identification method includes the steps of forming a users database in each electronic identification facility and identifying the system user. During the step of forming the users database, the following steps are executed:

a) Identifying a presence of living matter on the identification surface of one of the electronic identification facilities when the user's hand is placed on the identification surface, b) Scanning the hand by the identification facility subject to the presence of living matter, c) Forming a user identification geometry hand parameters set corresponding to a hand's geometry size by the identification facility, d) Converting the set into user identification code by the identification facility, e) Entering the user identification code and individual information in a identification facility memory unit database, f) Transmitting the user identification code and individual information to other identification facilities constituting a part of the electronic identification system through the telecommunication devices, g) Entering the user identification code and individual information in the other identification facility memory unit database;

during the step of identifying the system user, steps a) to d) are executed in series and then the following steps are executed:

h) Comparing the user's individual code to code extracted from the identification facility memory unit database, i) Displaying on a monitor of the mentioned identification facility individual information stored together with the identification code in the identification facility memory unit database subject to a positive result in the comparing step, and j) Forming a permissive access signal transmitted to an execution facility.

It seems preferable to convert the user's set of identification geometry parameters corresponding to characteristic hand geometry size into the user identification code by using at least one converting algorithm selected from a number of prerecorded converting algorithms.

Algorithm selection can be made automatically.

The electronic identification apparatus operator can chose algorithm.

While comparing the user individual code to latter extracted from the mentioned identification apparatus memory unit database prerecorded lack of coincidence allowed errors are used.

Subject to negative comparing result the identification apparatus monitor displays access rejecting information.

To realize the applied invention an electronic identification system is presented containing electronic identification facilities connected through telecommunication facilities; Each electronic identification facility represents electronic personal identification device pertaining to a person's biometrical identification by the characteristic hand geometry and it is designed to provide:

a) Identifying of living matter presence on the mentioned identification surface of one of the electronic identification facilities when the user's hand is placed on the surface, b) Forming of the users' database by forming geometry identification parameters set of the users corresponding to the hand characteristic geometry size and converting of the mentioned set into the user identification code and its entry in database, c) Transmitting of the user identification code and individual information to other identification faculties in order to enter of the mentioned code and individual information in the appropriate identification apparatuses' database, d) The user's possible identification also by comparing of its individual code to the latter extracted from the mentioned identification facility memory unit database and displaying of individual information stored together with the user identification code in database subject to positive result of comparing, e) Possible forming of permissive access signal sent to execution faciltity.

Apparatus of the person's identification pertaining to biometrical identification of geometry parameters corresponding to characteristic hand geometry size is presented, which contain:

a) Identification surface designed to identify living matter when the user places its hand on the surface, b) Device illuminating the user's hand designed to create additional beam of light in the identification surface area, c) The user's hand scanning device including photo-cell with memory unit only subject to presence of living matter on the identification surface, d) Identification processing device connected to the user's hand scanning device.

The device illuminating the user's hand designed to create additional beam of light in the identification surface area is equipped with biconvex lens with a single parabolic surface orientated in such a way that its optical axis is transversely to the identification surface.

BRIEF DESCRIPTION OF THE DRAWINGS

The invention differences and advantages shall become obvious to an average expert subject to detailed description and drawings, which.

DETAILED DESCRIPTION OF THE PREFERRED INVENTION VERSION

Figure 2:
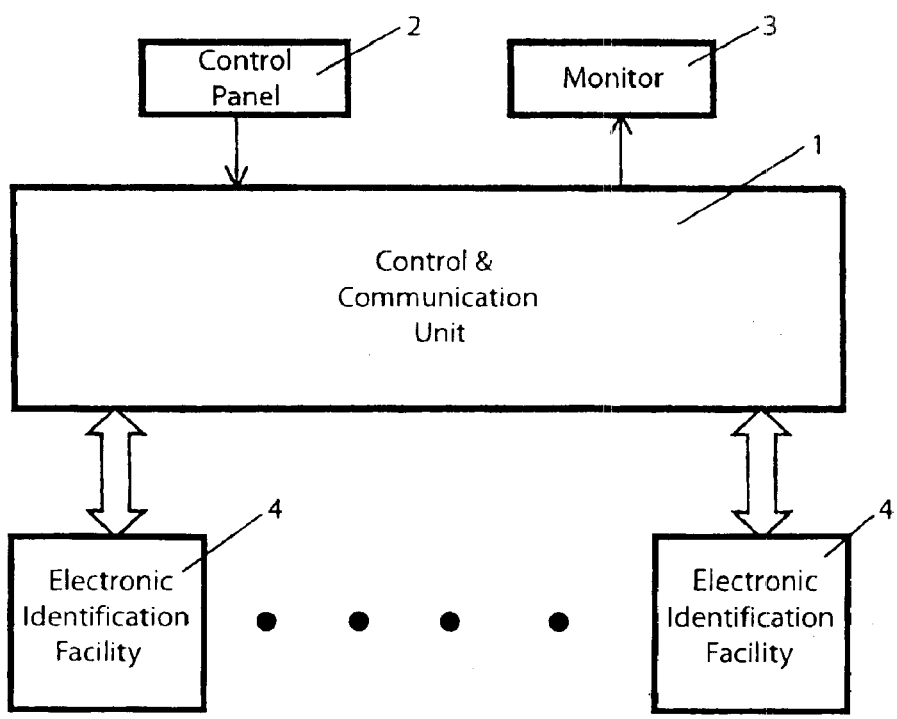
FIG. 2 shows electronic identification diagram.

Electronic identification system shown by FIG. 2 includes N number of electronic identification facilities (4) connected to each other through telecommunication facilities, which include the control and commutation unit (1) connected to the control panel (2) and monitor (3) and lines of telecommunication.

Figure 3:
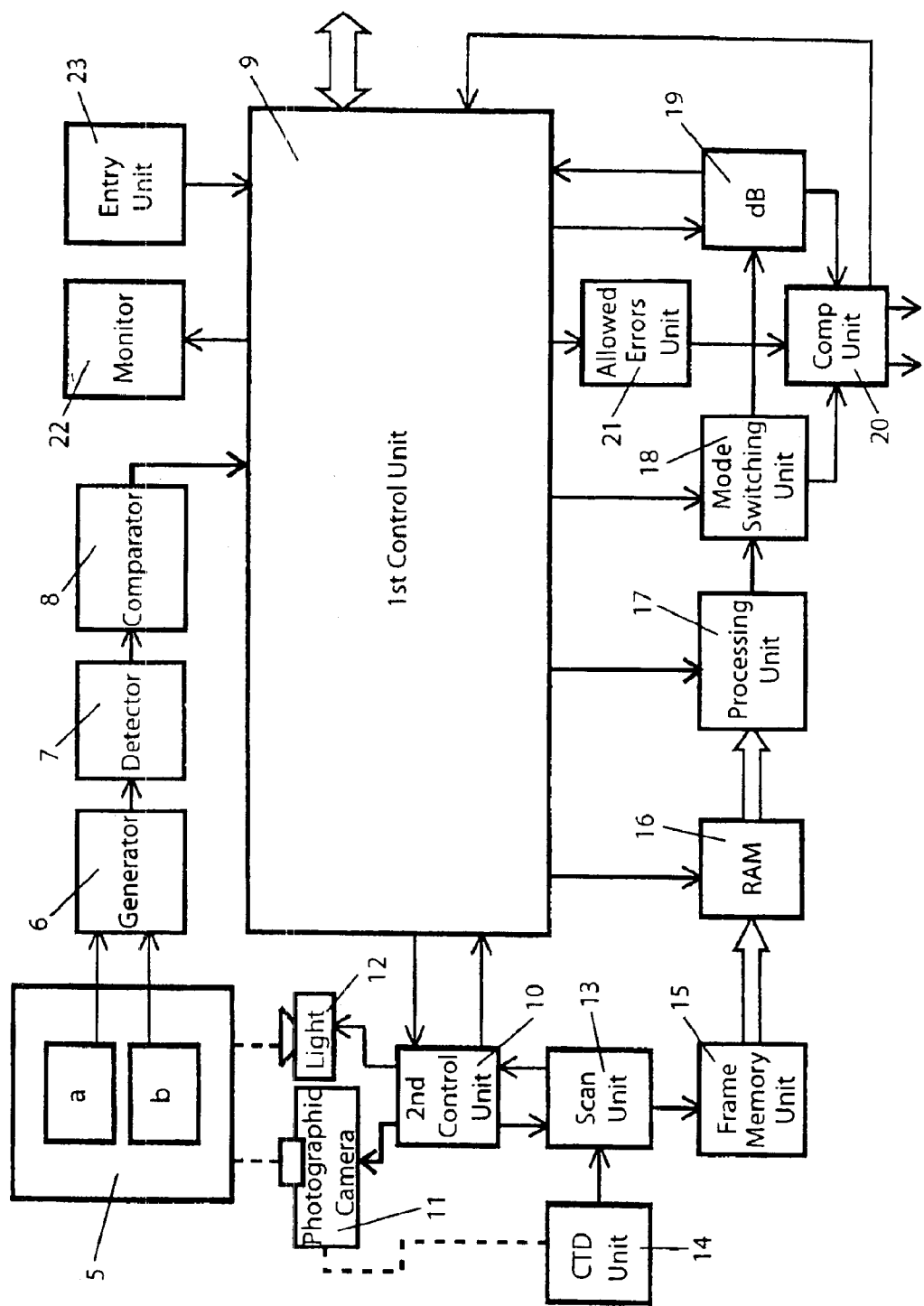
FIG. 3 shows identification apparatus operation scheme.

Each identification facility (4) shown by FIG. 3 represents a device designed for personal biometrical identification pertaining to characteristic geometry of the person's hand and includes identification surface (5) with "a" and "b" coatings on it that are connected to input of controlled generator (6). Output of generator (6) is connected up to the first input of the control unit (9) through the detector (7) with a filter and comparator (8) with static voltage. The first output of the control unit (9) is connected to the first input of the second control unit (10). The outputs of the latter are connected to the photographic camera (11), the lighter (12), the second control unit (9) and the scan unit (13) inputs. The second scan unit (13) input is connected to the charge transfer device (CTD) matrix (14) optically connected to the photographic camera (11). The second scan unit (13) outputs are connected to the second input of the second control unit (10) and frame memory unit (15) unit. Output of the unit (15) is connected to informational input of the random-access memory (16), controlling input of which is connected to the second output of the control unit (9) and output—to the informational input of the processing unit (17). The informational input of the processing unit (17) is connected to the first unit of the mode-switching unit (18). The second input of the mode switching unit (18) is connected to the fourth output of the control init (9) and outputs of the mode switching unit (18) are connected to the first data base (19) inputs and comparator unit (20). The second input of the comparator unit (20) is connected to the first database (19) output and the third input of the unit (20) is connected to the fifth output of the control unit (9) through allowed errors unit (21). The sixth output of the control unit (9) is connected to the second database (19) input, the second output of which is connected to the third input of the control unit (9). The fourth input of the control unit (9) is connected to the first output of the comparator unit (20), the second and the third outputs of which are the outputs of the apparatus.

Monitor (22) and the entry unit (23) are connected to the control unit (9). The control unit (9) represents a micro processing unit generating control commands and includes also the clock oscillator providing the apparatus units operation, coding and decoding points of the entry unit (23) and monitor signals.

To provide communication with the control and commutation unit (1) the unit (9) is equipped with an output to telecommunication facilities. Database (19) can be created on the magneto-optical disc; the entry unit (23) can be made as a sensor panel on monitor screen or in the form of a traditional keyboard.

The units 9, 10, 13 and from 15 to 23 constitute the identification processing facility.

Figure 4:
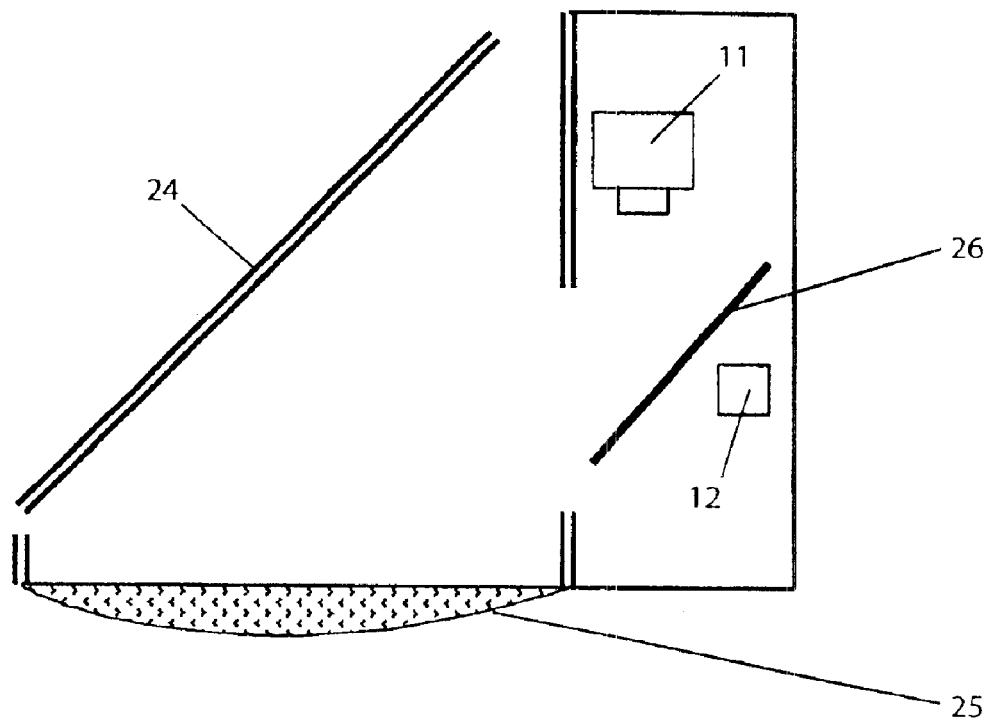
FIG. 4 shows optical scheme of identification apparatus sensor.
Figure 4:
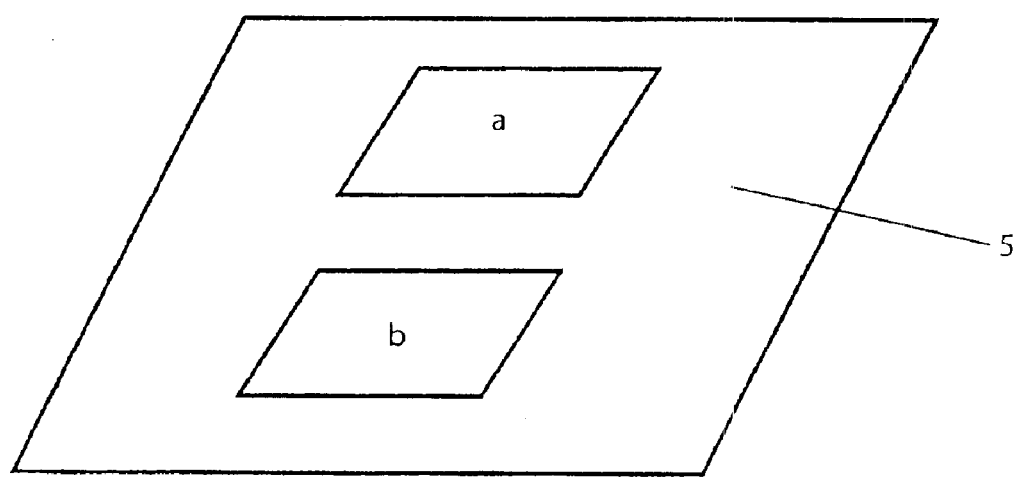

The hand image-producing device of the identification facility (4) shown by FIG. 4 includes identification surface (5) with "a" and "b" coatings and the hand scanner that is preferably represented by the photographic camera (11) containing photosensitive element with memory. Possibility to scan living matter only on the identification surface (5) is provided by connecting "a" and "b" coatings to control generator (6), which exert influence upon the lighter (12) through the detector (7), comparator (8) and control units (9 and 10).

The lighter (12), mirror (24), parabolic lens (25) and 50-percent mirror (26) constitute the facility to illuminate the user's hand surface.

The lens (25) represents a biconvex lens with a single parabolic surface orientated in such a way that its optical axis is transversely to the identification surface (5).

The identification surface (5) is made of insulating material and serves to reflect the lighter (12). "a" and "b" coatings represents metal plates connected to the bottom side of the identification surface (5).

The lighter (12), a LED for instance, is mounted inside the parabolic lens (25) focal plane. A negative lens (conditionally not shown) is mounted in front of the lighter (12) to fill in with light the lens (25) aperture angle. The lighter (12) optical axis is matched with the photographic camera (11) axis through the 50-percent mirror (26). The parabolic lens (25) provides telecentric rays path and its clear aperture is equal to the object's diameter. Three-lens photographic camera (11) object glass provides enlargement and aberration amendment. A cutting off filter (conditionally not shown) is mounted close to the three-lens object glass to provide operation radiation filtration.

The identification system operates the following way.

The control and commutation unit (1) of the system connecting the identification facilities (4) to each other provides passing of information stored by one of the identification facilities (4) to all other ones or only to those selected by the identification apparatus operator and ensures automatic switch on or off of the identification facilities (4), for instance, according to prerecorded time or change information processing manually by means of the control panel (2), or control the identification facilities (4) operation by means of monitor.

The identification process in the facilities (4) starts with identification of living matter, i.e. parameters identification of the object placed on the identification surface (5), on which electrically isolated coatings "a" and "b" are situated that constitute the condenser included in the generator (6) frequency driving circuits. Frequency of the latter depends upon complex impedance of the object placed on the coatings in question. Living matter complex impedance exceeds those of any other material by several orders and owing to it the control generator (6) output voltage frequency and amplitude are changing subject to presence of the hand on the surface (5). The control generator (6) output voltage is detected and filtered by the detector (7) and the comparator (8) is switched upon influence of the detector (7) voltage.

Upon influence of voltage drop in the comparator (8) output and the control unit (9) first input the latter forms the signal in the first output that initiates operation of the second control unit (10) including the photographic camera (11) and the lighter (12).

Thus, the comparator (8), to one input of which constant potential is applied and to another the detected signal is passed from the generator (6), compares both signals and changes the output potential from high-level to low-level subject to the signals are equal. This change is recognized a signal that the user's hand is placed on the identification surface. Then the hand is scanned.

Beam of light passes from the lighter (12) through 50-percent mirror (26), reflects from mirror (24) upright down and after passing through parabolic lens (25) lights the object placed on the identification surface (5). Light reflected from the object the surface (5) passes through parabolic lens (25), then it is reflected by mirror (24) and 50-percent mirror (26) and finds itself in photo-receiver (12). Light-sensitive surface of photo-receiver (12) (CTD matrix 14) is optically mated with the object's surface and thus the object's contour (the hand) is projected to CTD matrix (14).

Then the user identification geometry parameters set is formed and at the same time the second control panel (10) switches on the scan unit (13), which consequently scans the CTD matrix (14) elements, converts the signal of each matrix element into a digital mode and entry in the frame memory unit (15). Scanning, numeralization and entry procedures total not more than 0.1 s. The number of the CTD matrix (14) elements is known and since the CTD matrix (14) elements condition is numeralized and entered in the frame memory unit (15), the scan unit (13) passes a signal to stop entry to the second input of the control unit (9) through the second control unit (10). In the second output the unit (9) forms a signal of information rewrite from the memory unit (15) to the random-access memory (16), then in the third output of the control unit (9) there are formed a signal switching on the processing unit (17), which converts the obtained image into a digital mode. At the same time the hand geometry sizes are calculated according to a definite algorithm and converted into the object's identification code. Processing algorithm is stored in the unit (17) and it can be adjusted with the help of the input unit (23) or the control and commutation unit (1) of the system.

Figure 1:
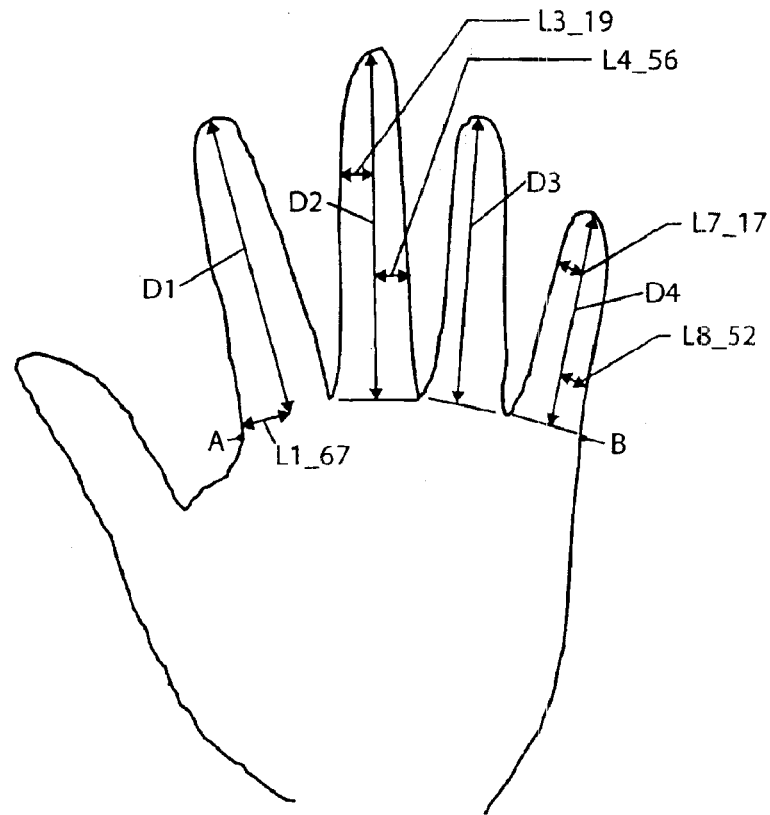
FIG. 1 shows the identified object, i.e. the user's hand.

FIG. 1 shows the user's hand contour. In the processing unit (17) the following parameters are calculated:

S: the hand projection square;
S1 . . . S8: square of the half fingers projections taken from the different sides of the crotches of the appropriate finger projection;
O: the hand envelope line length (i.e. length of the line enveloping the hand contour from point A to point B);
O1 . . . O8: the half fingers envelope line length (i.e. length of the line enveloping the appropriate half finger contour from the top of the finger to the socket);
D1 . . . D4: the fingers crotches length;
Lxy: half of the fingers section, x: finger number, y: distance from the top of the finger to the appropriate section;

After calculating appropriate parameters ratio between them are calculated and the identification code according to prerecorded algorithms id formed.

An example of algorithm:
$1^{st}$ step: length of the identification code is accessed (in bytes)—23;
$2^{nd}$ step: value obtained according to formula S/S1 is entered in the first byte;
$3^{rd}$ step: value obtained according to formula S/S2 is entered in the second byte;
$4^{th}$ step: value obtained according to formula S/S3 is entered in the third byte;
$5^{th}$ step: value obtained according to formula S/S4 is entered in the fourth byte;
$6^{th}$ step: value obtained according to formula S/S5 is entered in the fifth byte;
$7^{th}$ step: value obtained according to formula S/S6 is entered in the sixth byte;
$8^{th}$ step: value obtained according to formula S/S7 is entered in the seventh byte;
$9^{th}$ step: value obtained according to formula S/S8 is entered in the eighth byte;
$10^{th}$ step: value obtained according to formula O/O1 is entered in the ninth byte;
$11^{th}$ step: value obtained according to formula O/O2 is entered in the tenth byte;
$12^{th}$ step: value obtained according to formula O/O3 is entered in the eleventh byte;
$13^{th}$ step: value obtained according to formula O/O4 is entered in the twelfth byte;
$14^{th}$ step: value obtained according to formula O/O5 is entered in the thirteenth byte;
$15^{th}$ step: value obtained according to formula O/O6 is entered in the fourteenth byte;
$16^{th}$ step: value obtained according to formula O/O7 is entered in the fifteenth byte;
$17^{th}$ step: value obtained according to formula O/O8 is entered in the sixteenth byte;
$18^{th}$ step: value obtained according to formula D1/D2 is entered in the seventeenth byte;
$19^{th}$ step: value obtained according to formula D2/D3 is entered in the eighteenth byte;
$20^{th}$ step: value obtained according to formula D3/D4 is entered in the nineteenth byte;
$21^{st}$ step: value obtained according to formula D2/D4 is entered in the twentieth byte;
$22^{nd}$ step: value obtained according to formula D3/D1 is entered in the twenty-first byte;
$23^{rd}$ step: value obtained according to formula D2/D4 is entered in the twenty-second byte;
$24^{th}$ step: value obtained according to formula D4/D1 is entered in the twenty-third byte.

Should other algorithms to obtain the identification code are used other parameters set and/or other sequence order of the parameters in question are used.

During set up procedure the administrator determines the user identification code obtain algorithm. To do this the form providing each identification code byte calculation formula selection on the basis of the user's hand geometry is displayed.

The obtained identification code, depending upon the mode switching unit (18) condition, is passed during initial scanning either to database (19) and stored in it, or to the comparator unit (20) during repeated scanning and the object control. The operator sets up the apparatus operation mode and the mode switching unit (18) condition by means of the input unit (23). During initial scanning additional individual information on the object is entered in database (19) with the help of the input unit (23) that is stored together with the identification code. During repeated scanning the object's identification code is compared in the comparator unit (20) to the identification code stored in database (19).

At the same time providing that the hand is placed on the identification surface (5) at will and each time somehow differently the obtained identification codes cannot coincide completely. To eliminate codes lack of coincidence the allowed errors unit (21) is provided, that drives the allowed errors rate, for instance, by ignoring errors of the code low-order digits. The allowed errors rates can be driven and adjusted by the operator with the help of the input unit (23).

Since the compared codes coincide (subject to the allowed errors rates) the result of identification is recognized positive, the comparator unit (20) forms 'The object is identified' signal in one of the outputs, appropriate message is displayed on the monitor's (22) screen and individual information on the object is extracted from database (19). Since the compared codes don't coincide, the comparator unit (20) forms 'The object is not identified', appropriate message is displayed on the monitor's (22) screen.

Figure 5:
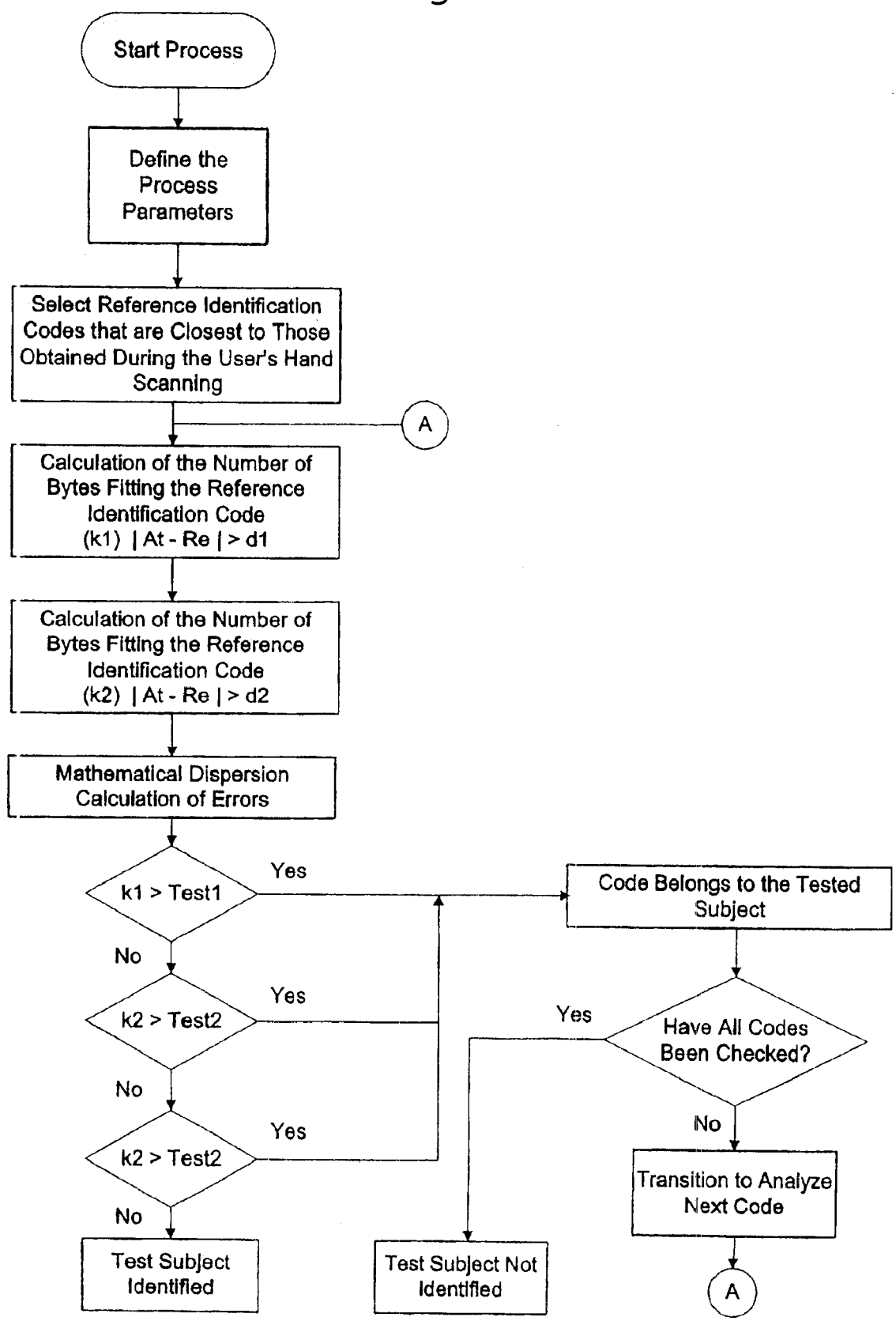
FIG. 5 shows identification algorithm structural scheme.

One of the comparing identification codes algorithms flow block shown by FIG. 5 explains this process.

When setting up the process parameters the following of the latter are defined:

n: number of bytes in the identification code;
d1: minimum difference between number of bytes in the obtained and the reference codes;
k1: number of bytes differs more than by d1 value;
d2: maximum difference between number of bytes in the obtained and the reference codes;
k2: number of bytes differs more than by d2 value;
D: mathematical dispersion;
Test 1: maximum number of k1 bytes;
Test 2: maximum number of k2 bytes;
Test D: maximum dispersion value;
At: reference identification code (the identification code obtained during the users' database forming);
Re: analyzed identification code (the identification code obtained during the identification stage).

The comparing process includes the following stages:
1. Defining of all the variable and constant data needed for identification.
2. Selection of the reference identification codes from database mostly close to those obtained during the user's hand scanning.
3. Defining of bytes difference between one of the selected reference codes (At) and the analyzed identification code (Re); since this difference is more than d1 value then k1 value is increased by one. (This value defines the number of bytes differ by minimum difference).
4. Defining of bytes difference between the reference code (At) and the analyzed one (Re); since this difference is more than d2 value then k2 value is increased by one. (This value defines the number of bytes differ by maximum difference).
5. Mathematical dispersion (D) calculation of errors between bytes of the reference (At) and the analyzed (Re) codes.
6. Comparing of k1 value to given Test 1 value; since k1 is more than Test 1 it means that the analyzed identification code does not correspond to the reference one.
7. Comparing of k2 value to given Test 2 value; since k2 is more than Test 2 it means that the analyzed identification code does not correspond to the reference one.
8. Comparing of mathematical dispersion value D to given Test D value; since D is more than Test D it means that the analyzed identification code do not correspond to the reference one.
9. Since three parameters are not exceeded it means that the analyzed identification code corresponds to the reference one, i.e. the user identification is completed.
10. In case identification did not take place then conversion to the other selected identification code occurs subject to it was not the last one.

Data defining the object's (the hand) measurement error rate is stated below as follows:
1. Distortion of the object glass.
This error leads to the object size distortion.

It is equal to:
for Y=80 mm=1%, where Y is the distance from the lens optical axis to gage point; in this very case it means the distance from the lens optical axis to the lens edge;
for Y=40 mm=0.33% (measurement error in the point located at 40 mm from the lens optical axis);
2. Error of projection.

This error results from the object distortion due to the principal rays inclination path from the objective glass to the object (the hand). This error arises during the hand projecting. To minimize this error the objective glass is designed with telecentric ray path in the identification area (it means that in this area rays path parallel). Telecentric declination (t) results in the object distortion, i.e. projection distortion (q).

The results of calculation are as follows:
for Y=80 mm: t=0.005 radian, from where q=20×t=0.1 mm or less than 0.1%;
for Y=40 mm: t=0.0004 radian, q=0.008 mm or less than 0.01%.

This calculation is made for the finger thickness of 20 mm.

Thus, the main error causing measurement error happens to be distortion amounting to less than 1%.

Sensor optical scheme of the apparatus allowing to obtain the object's image with minimum distortion (<1%), mathematical processing of the object digital reflection, during which there are calculated the hand parameters that are least subject to changes during arbitrary superposition, make it possible to identify objects with high reliability.

What is claimed is:

1. A user identification method using an electronic identification system comprising at least a first and a second electronic identification device connected by at least one telecommunication line, the method comprising the steps of: forming a user database in each electronic identification device and identifying a user, wherein:

the step of forming the user database comprises the steps of:
a) identifying living matter on an identification surface of the first identification device while the a user's hand is placed on the identification surface,
b) scanning the hand when living matter is identified on the identification surface,
c) forming a set of geometry parameters corresponding to characteristics of the hand,
d) converting the set of geometry parameters into an analyzed identification code,
e) entering the analyzed identification code and individual information of the user in the user database in the first identification device,
f) transmitting the analyzed identification code and individual information of the user to the second identification device through the telecommunication line, and
g) entering the analyzed identification code and the individual information of the user in a user database of the second identification device; and the step of identifying the user comprises the steps a) to d) executed in series and further comprises the steps of:
h) comparing the analyzed identification code to a reference identification code extracted from the user database of the second identification device,
i) displaying on a monitor of the first identification device the analyzed individual information stored with the analyzed identification code in the user database of the first identification device when the result of the step of comparing the analyzed identification code to the reference identification code is positive, and j) transmitting a permissive access signal to an execution device when the result of the step of comparing the analyzed identification code to the reference identification code is positive.

2. The method of claim 1 wherein the step of converting the set of geometry parameters into the analyzed identification code comprises the step of using at least one converting algorithm selected from different given converting algorithms.

3. The method of claim 2 wherein the step of using the converting algorithm comprises the step of automatically selecting the converting algorithm.

4. The method of claim 2 wherein the step of using the converting algorithm comprises the step of allowing a selection of the converting algorithm.

5. The method of claim 1 wherein the step of comparing the analyzed identification code to the reference identification code comprises the step of using a predetermined allowed error.

6. The method of claim 1 further comprising the step of displaying a rejecting access signal on the monitor of the second identification device when the result of the step of comparing the analyzed identification code to the reference identification code is negative.

7. An electronic identification system comprising:

first and second electronic identification devices connected to each other through at least one telecommunication line, each of the electronic identification devices being a device for biometrical personal identification based on characteristics of a user's hand, wherein:

said first electronic identification device identifies living matter on an identification surface of said first electronic identification device when a user's hand is placed on the identification surface, said first electronic identification device scans the hand when living matter is identified, said first electronic identification device comprises a user database storing a set of geometry parameters corresponding to characteristics of the user's hand, said first electronic identification device converts the set of geometry parameters into an analyzed identification code entered in the user database;

said first electronic identification device transmits the analyzed identification code and individual information of the user to said second electronic identification device to enter the analyzed identification code and the individual information in a user database of the second identification device, said first electronic identification device compares the analyzed identification code to the reference identification code extracted from the user database of the second electronic identification device;

said first electronic identification device stores the individual information and the analyzed identification code in the user database when a positive result is achieved from comparing the analyzed identification code and the reference identification code;

said first electronic identification device comprises a monitor that displays the individual information; and said electronic identification device sends a permissive access signal to an execution device.

8. A device for biometrical personal identification based on hand characteristics, comprising:

a) an identification surface for identifying living matter when a user's hand is placed on the identification surface, b) an illuminating device illuminating the hand and emitting parallel beams of light in an area of the identification surface, c) a hand scanning device comprising a photo-cell with a memory unit that scans the user's hand only when living matter is identified on the identification surface, d) an identification processing device connected to the hand scanning device.

9. The device according to claim 8, wherein the identification surface comprises first and second electrically isolated coatings for detecting a complex impedance of an object placed on the identification surface.

10. The device according to claim 9, wherein the object placed on the identification surface is identified based on the complex impedance detected by the first and second electrically isolated coatings.

11. A device for biometrical personal identification based on hand characteristics, comprising:

a) an identification surface for identifying living matter when a user's hand is placed on the identification surface, an illuminating device illuminating the hand and emitting parallel beams of light in an area of the identification surface, c) a hand scanning device comprising a photo-cell with a memory unit that scans the user's hand only when living matter is identified on the identification surface, d) an identification processing device connected to the hand scanning device, wherein the illuminating device comprises a biconvex lens with a single parabolic surface with an optical axis that is transverse to the identification surface.

12. A user identification method using an electronic identification system comprising at least a first and a second electronic identification device connected by at least one telecommunication line, the method comprising the step of forming a user database in each electronic identification device, the step of forming the user database comprising the steps of:

a) identifying living matter on an identification surface of the first identification device while a user's hand is placed on the identification surface, b) scanning the hand when the living matter is identified on the identification surface, c) forming a set of geometry parameters corresponding to characteristics of the hand, d) converting the set of geometry parameters into an analyzed identification code, e) entering the analyzed identification code and individual information of the user in the user database in the first identification device, f) transmitting the analyzed identification code and the individual information of the user to the second identification device through the telecommunication line, and g) entering the analyzed identification code and the individual information of the user in a user database of the second identification device.

13. The method of claim 12 wherein the step of converting the set of geometry parameters into the analyzed identification code comprises the step of using at least one converting algorithm selected from different given converting algorithms.

14. The method of claim 13 wherein the step of using the converting algorithm comprises the step of automatically selecting the converting algorithm.

15. The method of claim 13 wherein the step of using the converting algorithm comprises the step of allowing a selection of the converting algorithm.

16. A user identification method using an electronic identification system comprising at least a first and a second electronic identification device connected by at least one telecommunication line, the method comprising the step of identifying a user, the step of identifying the user comprising the steps of:

a) identifying living matter on an identification surface of the first identification device while a user's hand is placed on the identification surface, b) scanning the hand when the living matter is identified on the identification surface, c) fanning a set of geometry parameters corresponding to characteristics of the hand, d) converting the set of geometry parameters into an analyzed identification code, e) comparing the analyzed identification code to a reference identification code extracted from a user database of the second identification device, f) displaying on a monitor of the first identification device the analyzed individual information stored with the analyzed identification code in the user database of the first identification device when the result of the step of comparing the analyzed identification code to the reference identification code is positive, and g) transmitting a permissive access signal to an execution device when the result of the step of comparing the analyzed identification code to the reference identification code is positive.

17. The method of claim 16 wherein the step of converting the set of geometry parameters into the analyzed identification code comprises the step of using at least one converting algorithm selected from different given converting algorithms.

18. The method of claim 17 wherein the step of using the converting algorithm comprises the step of automatically selecting the converting algorithm.

19. The method of claim 17 wherein the step of using the converting algorithm comprises the step of allowing a selection of the converting algorithm.

20. The method of claim 16 wherein the step of comparing the analyzed identification code to the reference identification code comprises the step of using a predetermined allowed error.

21. The method of claim 16 further comprising the step of displaying a rejecting access signal on the monitor of the second identification device when the result of the step of comparing the analyzed identification code to the reference identification code is negative.

* * * * *